Jan. 23, 1968  E. F. BRILL  3,365,053
APPARATUS FOR HANDLING LOOSE MATERIAL
Filed Oct. 7, 1966  2 Sheets-Sheet 1
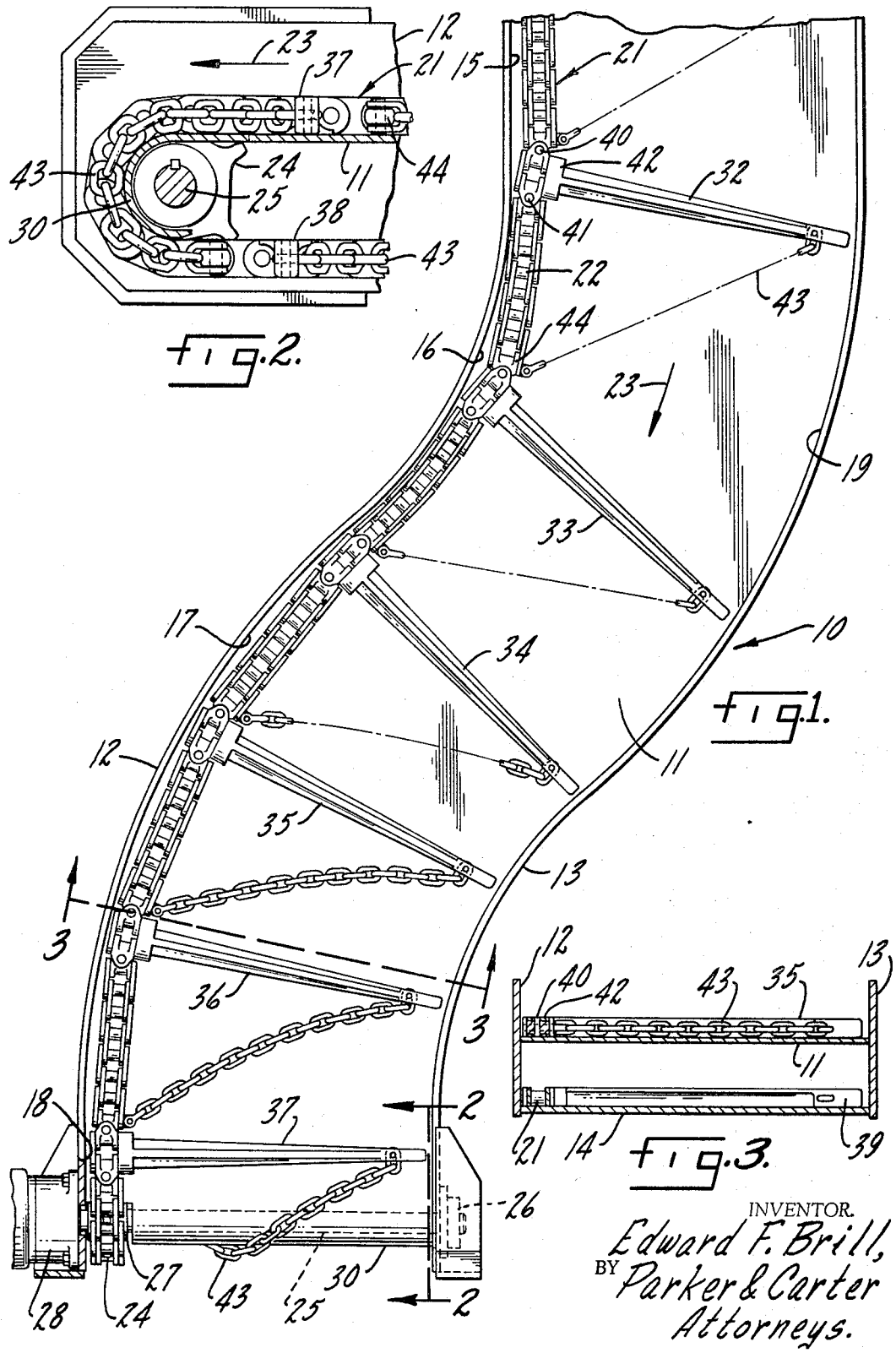
INVENTOR.
Edward F. Brill,
BY Parker & Carter
Attorneys.

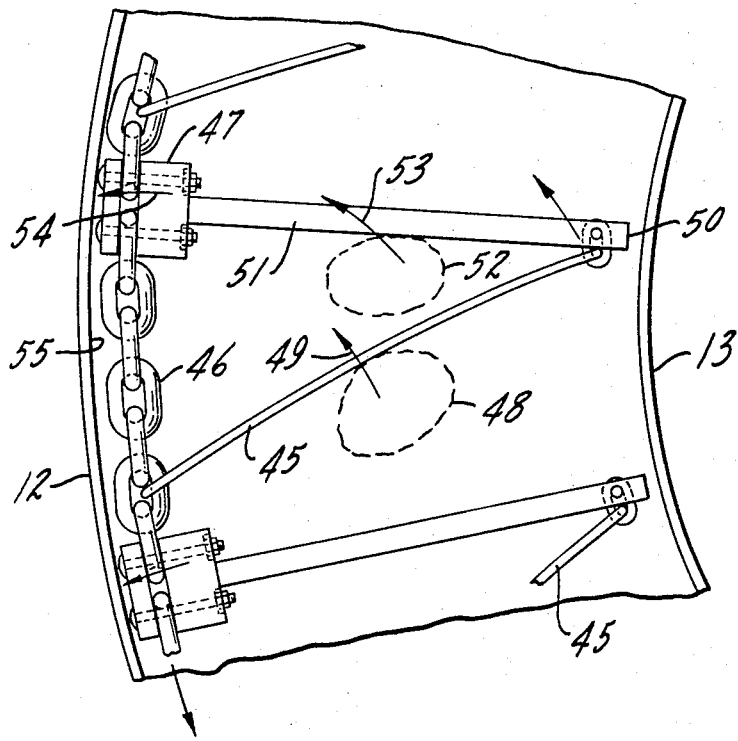

United States Patent Office 3,365,053
Patented Jan. 23, 1968

3,365,053
APPARATUS FOR HANDLING LOOSE MATERIAL
Edward F. Brill, Oconomowoc, Wis., assignor to Westinghouse Air Brake Company, Pittsburgh, Pa., a corporation of Pennsylvania
Filed Oct. 7, 1966, Ser. No. 585,186
10 Claims. (Cl. 198—171)

ABSTRACT OF THE DISCLOSURE

An apparatus for conveying loose material along a conveying course defined by an upwardly opening trough having sprockets at each end thereof which are adapted to engage and drive an endless link chain which is slidably supported within the trough adjacent one trough side wall; the link chain carries a plurality of flights extending therefrom in a direction transverse to said adjacent side wall. Each flight has a flexible member attached thereto at a point spaced from the point of connection of the flight to the link chain; the other end of the flexible member is attached to the link chain at a point downstream of the point of connection of the flight to the link chain so that as the link chain is moved within the trough, it is urged toward said adjacent trough side wall to thereby prevent damage to the flights by engagement with the other trough side wall.

---

This invention relates generally to conveyors, and particularly to a flight conveyor which will convey material along a curved path. These conveyors typically include a flexible tension member, such as a chain, having flights or scrapers connected thereto which project outwardly therefrom, the chain being driven by any suitable means such as a drive sprocket located at the head or discharge end of the conveyor. Usually the chain is trained about a take-up sprocket at the tail end of the conveyor. The sprockets reverse the direction of movement of the chain as it passes therearound to thereby form an endless, orbitally movable conveyor. This invention is particularly concerned with the single or unbalanced type construction in which the flights extend outwardly from only one side of the tension chain.

Normally the tendency of a driven, universally flexible, tensioned chain is to pull straight between the two direction changing sprockets and move away from a side wall disposed along an outside radius. When this happens the ends of the flights are forced against the conveyor side wall at the inside radius, often resulting in breaking or bending of the flights and breaking of the chain.

This problem has been overcome with the present invention by providing flexible members connected angularly between the end of flight and the universal chain in a load supporting manner. The flexible members serve to restrain the ends of the flights by limiting their backward deflection. But, more importantly, the conveying loads on the flexible members and on the flights induce a resultant force in the chain urging it into contact with the curved guide surface, including outside radius portions of the guide surface.

Accordingly, a primary object of the invention is to provide a flight conveyor which will convey material about an outside radius without breaking, bending, or binding of the conveyor components, or disturbance of the conveying action.

Another object is to provide a conveyor as above described which, though effective throughout the range from no-load to full-load conditions, will function with increasing efficiency with increasing load.

Another object is to provide a cantilevered flight conveyor chain having an inherent ability to follow a curved conveyor frame, and in which the ends of the flights are not subjected to fouling against the side walls of the conveyor frame.

Another object is to provide a conveyor chain having flights extending from one side of the chain with the other side guided for movement along a curved guide surface of a conveyor frame, wherein the curved guide surface extends, at least in part, about an outside radius of the conveyor frame.

Still another object is to provide a comparatively wide conveyor chain having flights extending from one side thereof, wherein a flight end restraining means is arranged to impart a lateral force on the chain which urges it against a guide surface extending along an outside radius of a curved conveyor frame.

Other objects and advantages of the invention will become apparent from the following description thereof.

The invention is illustrated more or less diagrammatically in the accompanying figures herein.

FIGURE 1 is a top plan view of a section of a conveyor incorporating the subject of the present invention;
FIGURE 2 is a view to an enlarged scale taken substantially along the line 2—2;
FIGURE 3 is a view taken substantially along the line 3—3; and
FIGURE 4 is a partial plan view to an enlarged scale of an alternative embodiment of the invention.

Like reference numerals will be used to refer to the same or similar parts throughout the following description of the drawings.

A flight conveyor is indicated generally at 10 in FIGURE 1. The conveyor includes a trough shaped conveyor frame having a bottom pan 11, which provides a carrying surface for the material to be conveyed, and a pair of material retaining side walls 12 and 13, best illustrated in FIGURE 3. Side walls 12 and 13 extend downwardly beneath bottom pan 11 a substantial distance and a second pan 14 is secured to the lower end portions of the side walls, this second pan supporting the return run of the conveyor.

Side walls 12 and 13 are curvilinearly contoured as will be obvious from FIGURE 1. In the illustrated embodiment, and referring to side wall 12 as a reference wall, the side wall includes a linear section indicated at 15, an inside radius curve section indicated at 16, an outside radius curve section indicated generally at 17 and a second, generally linear section indicated at 18. It will be understood that the phrases "inside radius" and "outside radius" are used in connection with reference to the working surface of the side wall. It will be obvious therefore that the opposite side wall 13 will be substantially oppositely contoured. Thus, that section of right wall 13 opposite the inside radius curve portion 16 of left wall 12 has an outside radius curve portion indicated at 19.

An appropriate tension member is indicated generally at 21. In this instance, the tension member is a chain composed of a plurality of bicycle chain type links, the links being pivotally connected to one another to flex freely in a vertical plane. It will be understood that because of manufacturing tolerances some flexing motion in a horizontal plane will occur as best indicated, for example, in that section of the chain indicated at 22. The chain moves in the direction of arrow 23 and is driven by a drive sprocket 24 shown best in FIGURES 1 and 2. The drive sprocket is carried by a shaft 25 which is journaled in bearings 26 and 27, the shaft being driven by a motor or any other suitable power source 28 which is associated with the head or discharge end of side wall 12. As best seen in FIGURE 2 the bottom pan 11 is curved at its head or discharge portion as indicated at 30 so as to prevent fouling of the tension member 21 as it passes over the head end of the conveyor. A similar take-up sprocket, not shown, is located at the tail or receiving end of the conveyor and preferably at a location in which the conveyor extends linearly therefrom.

A plurality of flights or scrapers are indicated at 32, 33, 34, 35, 36, 37, 38 and 39. Each flight is pivotally connected by pivot means 40, 41 to adjacent links in tension member 21. In this instance each flight has been formed from a single integral piece of material, such as a casting. The trailing and leading sides of the base portion 42 carry the pivot means 40 and 41. In this instance the base portion 42 forms, in effect, an individual link in the tension member 21. It should be understood, however, that this showing is exemplary only and it is quite within the scope of the invention to form the flight 32 in such fashion as to extend outwardly from one of the side plates which form one of the individual chain links. The advantage of the illustrated construction is that a wide range of flexibility in a horizontal plane can be incorporated into the system without the use of special universal type chain links.

A flexible member 43 is connected to the outer end portion of each of flights 32-39 and to a chain link at a location remote from the base portion 42 of its associated flight. In the FIGURE 1 embodiment flexible member 43 has been connected to the chain link 44 which is closest to the next adjacent downstream flight 33. In this instance a conventional link chain has been illustrated. As can be best visualized from the relative position of flight 34 and the tension member on either side of it, a slight slackness is provided in flexible member 43.

In FIGURE 4 a slightly different embodiment has been illustrated. In this embodiment a flexible member which connects the outer end portion of the flight 51 to the tension member is a short length of wire rope 45. A conventional link chain 46 has been employed in lieu of the bicycle chain type linkage of FIGURE 1. The substitution of the conventional link chain requires use of a slightly different form of base 47 for the flight conveyor.

The use and operation of the invention are as follows:

A universally flexible conveyor chain 21 moving along a guide surface formed along an inside radius conveyor frame, as illustrated by area 16 of FIGURE 1, with the flights extending toward the outside radius will not usually encounter any fouling problems. No special means are generally required to hold the tension member 21 against the guide surface provided by the inside surface of wall 12.

When the chain 21 moves along an outside radius curve portion, as indicated in area 17 of FIGURE 1, the driven, tension chain 21 tends to pull straight between the two direction changing sprockets at the head and tail ends of the conveyor and thereby move away from the side wall disposed along the outside radius. When this happens the ends of the affected flights, such as flights 34, 35, 36, are forced against the conveyor side wall 13, often resulting in breaking or bending of the flights or breaking of the chain with consequent disturbance of the conveying action.

This problem has been overcome by providing a flexible member 43 which is connected angularly between the end portion of each flight and the tension member in a load-supporting manner. The flexible members 43 serve to restrain the ends of the flight, limiting their backward deflection. But more importantly, the conveying loads on the flexible members 43 and on the flights induce a resultant force in the chain 21 which urges it into contact with the adjacent curved guide surface 17.

Although the governing principles of operation and the force resolutions underlying the invention have not been determined with precision, it is contemplated that the invention functions substantially as follows.

Referring specifically to FIGURE 4, a load indicated generally at 48 which bears against the mid-portion of flexible wire rope 45 can be assumed to have a force component acting in approximately the direction of arrow 49. Assuming the left end of flexible member 45 is maintained in substantially its illustrated position, the imposition of force 49 at the indicated location will tend to move the outer end 50 of flight 51 in a downstream direction.

In similar fashion, a load 52 encountered by flight 51 may be considered to have a force component acting in the direction of arrow 53. The resultant forces generated by loads 48 and 52 exert a force 54 on flight 51 which tends to urge it laterally against the inside surface 55 of wall 12.

Although the above described embodiments are quite effective over all load levels from no load to full load, the effectiveness will tend to increase with an increase in load. This effect can be best illustrated by a further reference to FIGURE 4.

The flexible member 45 will bow backward under load 49, thereby tending to pull the outer end 50 of the attached flight 51 forward. However, the load 53 on the flight represents an equalizing force stabilizing the flight and the flexible member. The resultant force 54 of these force components acting on the chain 46 provides the means to urge the chain toward the guide surface 55. This force 54 is sufficiently large to overcome the chain tension tending to hold it away from the curved guide. The greater the loads on the flights and on the flexible members the greater will be the force tending to displace the chain from its normal course and move it laterally into a desired guide path along the guide surface 55.

Even when the chain is not conveying material, a frictional drag force on the cantilevered flights will provide some guiding influence on the chain.

It should also be understood that it is quite within the scope of the invention to fasten the leading end of each flexible member directly to the immediately preceding flight base 42, rather than to a link in the flexible tension member as illustrated in FIGURES 1 and 4. Thus, and referring to FIGURE 1 for convenience, the leading end of flexible member 43 may, if desired, be connected directly to base portion 42 of the immediately preceding flight, rather than to chain link 44 as illustrated in that figure.

Although several embodiments of the invention have been illustrated and described, it will at once be apparent to those skilled in the art that further modifications can be made within the spirit and scope of the invention. Accordingly, the foregoing description is intended to be illustrative only, and the scope of the invention should be limited only by the scope of the hereinafter appended claims.

I claim:
1. In a flight conveyor,
  a flexible tension member, a plurality of flights carried by and extending outwardly from the tension member,
  means for moving the tension member to thereby move material along the conveyor,
  a guide structure having a curvilinearly contoured outside radius guide surface against which the tension member is adapted to bear as the tension member moves with respect to said guide structure, and
  means for urging the tension member toward contact with the guide structure at all points in its path of travel, including travel along the outside radius guide surface when said tension member moves with respect to said guide structure.

2. The apparatus of claim 1 further characterized in that
  the means for urging the tension member against the guide surface includes
  a flexible member,
  said flexible member having one end portion thereof connected to a flight at a location remotely spaced from the point of connection of the flight to the tension member, said flexible member having the other end portion connected to the tension member at a location remotely spaced from the point of connection of the flight to the flexible tension member.

3. The apparatus of claim 2 further characterized in that each flight is connected to the tension member by means which provide a limited degree of swing of the outermost end portion of the flight about its connection to the tension member.

4. The apparatus of claim 3 further characterized in that the tension member is a bicycle type link chain, and further including pivot means for connecting the flight to the aforesaid chain.

5. The apparatus of claim 3 further characterized in that the tension member is a link chain.

6. The apparatus of claim 3 further characterized in that the flexible member is a link chain.

7. The apparatus of claim 3 further characterized in that each flexible member is connected to the tension member at a location closely adjacent the next downstream flight.

8. In a flight conveyor adapted to convey material along a conveying reach formed by a generally upwardly opening trough having a bottom joining a first and second side wall, and of the type having an endless flexible member slidably carried within said trough adjacent said first side wall, a plurality of flights carried by said endless flexible member and extending outwardly therefrom in a direction toward said second side wall, and means for driving the flexible member to thereby convey the material along the conveying reach, the improvement comprising:

a flexible member associated with each flight, each said flexible member having a first end connected to its respective flight at a point spaced from the point of connection of the flight to the endless flexible member and a second end connected to the endless flexible member at a point spaced from and downstream of the point of connection of the flight to the endless flexible member to thereby urge the endless flexible member toward the first side wall and the flights away from the second side wall as they are driven along the conveying reach.

9. The structure of claim 8 further characterized in that said conveying reach trough is formed with at least one curved portion having at least one center of curvature located on the side of the trough adjacent said second side wall.

10. A flight conveyor adapted to transport loose material along a conveying reach, said conveyor comprising:

an upwardly opening trough extending along and defining a conveying reach having at least one generally S-shaped curved portion, an endless flexible member having a conveying portion slidably carried within said trough and a return reach portion generally underlying said trough, means formed adjacent the ends of said trough for moving said endless flexible member within said trough and for reversing the direction of movement of said endless flexible member between said conveying portion and said return portion, a plurality of spaced flights carried by and extending from said endless flexible member, and a flexible member associated with each flight and having a first end connected to its respective flight at a point spaced from the point of connection of the flight to the endless flexible member and a second end connected to the flexible member at a point spaced from and downstream of the point of connection of the flight to the endless flexible member.

References Cited

UNITED STATES PATENTS

| 1,109,194 | 9/1914 | Zugalinski | 198—171 |
| 1,230,700 | 6/1917 | Gledhill | 198—171 |
| 2,113,733 | 4/1938 | Kraft | 198—171 |
| 3,298,499 | 1/1967 | Ellis | 198—171 |

RICHARD E. AEGERTER, *Primary Examiner.*